Sept. 2, 1952  J. A. RUSS  2,609,024
FOOD PREPARING DEVICE
Filed March 7, 1947
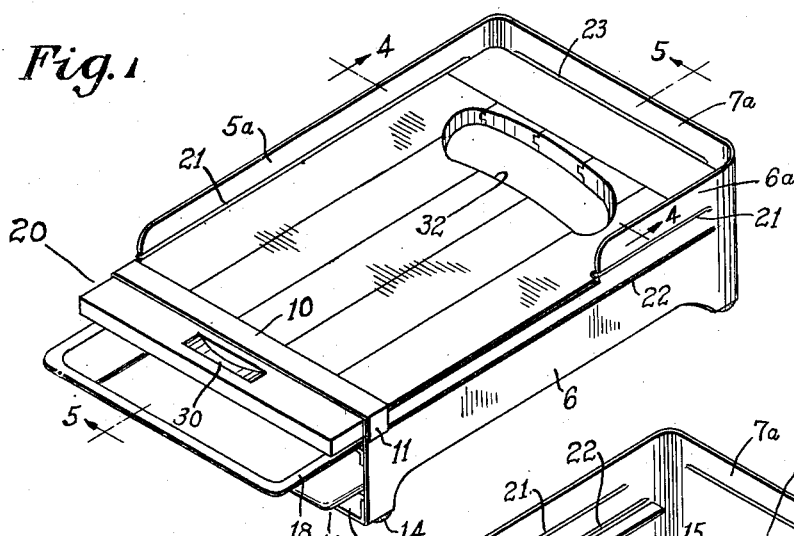
Fig. 1
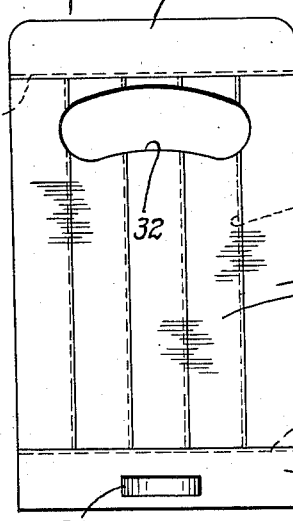
Fig. 3
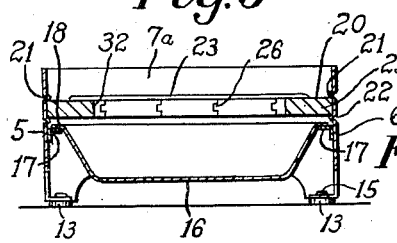
Fig. 4
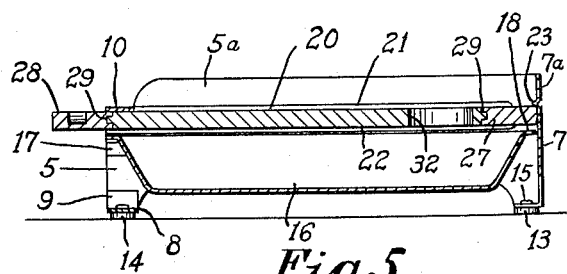
Fig. 2
Fig. 5
Inventor
John A. Russ
By Frease and Bishop
Attorneys Patented Sept. 2, 1952

2,609,024

UNITED STATES PATENT OFFICE 2,609,024

FOOD PREPARING DEVICE

John A. Russ, Massillon, Ohio

Application March 7, 1947, Serial No. 732,975

2 Claims. (Cl. 146—215)

The invention relates generally to food chopping boards and the like, and more particularly to a self-contained unit having a non-warping board and a receptacle for receiving and containing food chopped on the board.

In chopping or cutting foods in the ordinary kitchen, a flat cutting board is usually slidably mounted in the cupboard and is used in place or preferably withdrawn and placed on a table top or drain board, and the cut or chopped food is scraped from the board into a separate receptacle from time to time. This method of preparing food frequently results in spilling some of the food on the floor where it creates a hazard in that people stepping on the spilled food are apt to slip and fall, resulting in bodily injury. Moreover, the operation of scraping the chopped food into a separate receptacle requires extra time and additional working space which would otherwise be available for other kitchen work.

It is an object of the present invention to provide a self-contained food preparing unit having both a chopping board and a receptacle for receiving the chopped food.

Another object is to provide a self-contained food preparing unit including a cutting board with an opening therethrough and a removable receptacle below the opening suitable when removed for storing the chopped food in a refrigerator or the like.

Another object is to provide a self-contained food preparing unit having a frame solidly supporting a non-warping cutting board and slidably supporting the receptacle below the same.

A further object is to provide a novel food preparing device having a chopping board with a food receptacle located below the board and a guard wall around the board for preventing spilling of the food during chopping.

Finally, it is an object of the present invention to provide an improved self-contained food preparing unit which is simple, compact and inexpensive, and which overcomes the disadvantages of prior constructions.

These and other objects are accomplished by the parts, arrangements and combinations which comprise the present invention, the nature of which is set forth in the following general statement and a preferred embodiment of which is set forth in the following description and illustrated in the accompanying drawings, and which is defined in the appended claims forming part hereof.

In general terms, the invention may be stated as comprising a sheet metal frame having a flat non-warping chopping board slidably supported in the upper part thereof with portions of the frame projecting above the board to prevent spilling of the food therefrom, a food receptacle being removably mounted in the frame below the board and the board having a hole therethrough for allowing the chopped food to fall into the receptacle.

Referring to the drawing in which a preferred embodiment of the invention is shown by way of example;

Figure 1 is an isometric view of the improved food preparing device, showing the receptacle partially removed therefrom;

Fig. 2 is a similar isometric view of the frame with the cutting board and receptacle removed;

Fig. 3 is a detached plan view of the cutting board;

Fig. 4 is a transverse sectional view as on line 4—4, Fig. 1; and

Fig. 5 is a vertical sectional view as on line 5—5, Fig. 1.

Similar numerals refer to similar parts throughout the several views of the drawing.

The frame for the improved food preparing device is preferably made of a sheet metal stamping which is bent into U-shape, and which has side walls 5 and 6 connected by an integral end wall 7. The opposite ends of the side walls 5 and 6 are preferably rigidly connected together by a metal strip 8, which may have upturned flanges 9 at its ends secured to the inner surfaces of the side walls 5 and 6 as by welding. The upper front ends of the side walls 5 and 6 are preferably connected by a similar metal strip 10 having downturned flanges 11 at its ends overlapping and secured to the outer surfaces of the side walls 5 and 6 respectively as by welding.

At the corners between the side walls 5 and 6 and the end walls 7 of the frame, inturned ears 12 are preferably formed for mounting rubber feet 13, and similar rubber feet 14 are mounted in the bottom strip 8 at the front of the frame. These rubber feet are of usual construction, having an upper neck 15 which is forced through a hole in the metal ears 12 or strip 8, the resiliency of the rubber serving to detachably hold the rubber feet in place.

A sheet metal food receptacle of usual construction, indicated generally at 16 is slidably mounted in the lower part of the frame, and for this purpose longitudinal extending angles 17 are secured as by welding to the interior surfaces of the side walls 5 and 6. The receptacle 16 has an outturned peripheral flange 18 which is slidably supported on the angles 17 at both sides of the receptacle.

The improved non-warping chopping board indicated generally at 20 is slidably supported in the upper portion of the frame immediately above the receptacle 16. As shown, the side walls 5 and 6 of the frame are provided with inwardly formed longitudinal ribs or corrugations 21 and 22 located immediately above and below the side edges of the chopping board 20 so as to provide guideways for slidably supporting the board. The end wall 7 is likewise provided with an inwardly formed corrugation 23 which is adapted to engage over the inner end of the board when the same is fully entered into the frame, so that in that position the chopping board is solidly supported above and below its edges to prevent any tilting or jarring movement of the board during the chopping operation. The metal strip 10 fits slidably over the front end of the board to aid in holding it solidly in position.

As shown, the side wall 5 has an upper guard portion 5a which projects above the board 20 and the end wall 7 has a similar guard portion 7a, for retaining chopped food on the board and preventing spilling thereof. The side wall 6 has a shortened guard portion 6a at the rear end of the side wall, the front portion preferably having its upper edge substantially flush with the top of the board, to facilitate the chopping operation. The food preparing device as shown is designed for a right-handed person, and for a left-handed person the front portion of the guard 5a would be removed while the guard 6a would be extended the full length of the side wall 6.

In order to insure that the chopping board 20 does not warp, it is made up of several longitudinal wood pieces 25 having tongue and groove joints 26 therebetween, with cross pieces 27 and 28 at the ends of the board, being joined to the ends of pieces 25 by tongue and groove joints 29. The front cross piece 28 is preferably provided with a handle recess 30 as shown to facilitate removing the board for cleaning or washing it.

In order to transfer chopped food from the board 20 to the receptacle 16 during the chopping operation, the board is provided adjacent its rear end with an opening 32 of substantial size and extending across a substantial part of the board. The opening 32 is of a substantially elliptical shape in order to best facilitate scraping the chopped food therethrough into the receptacle.

Accordingly, the improved food preparing device provides a self-contained unit having both a chopping board and a receptacle thereunder for receiving the chopped food so that during the chopping operation additional space for the food receptacle is not required. Moreover, the upwardly projecting guard portions of the frame substantially prevent spilling of any of the food during the chopping operation, and the chopping board is solidly supported above the receptacle which is easily removable at any time, so that the chopped food can be temporarily stored in a refrigerator or the like, if desired.

The improved food preparing device is simple, compact and inexpensive, and is easily and conveniently used by the most unskilled persons.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is now limited to the exact details of construction.

Having now described the invention, the construction, the operation and use, and a preferred embodiment thereof, and the advantageous new and useful results obtained thereby; the new and useful constructions, and reasonable mechanical equivalents thereof obvious to those skilled in the art, are set forth in the appended claims.

I claim:

1. A self-contained food preparing unit including a receptacle, a flat chopping board completely covering said receptacle and having a relatively small opening therethrough at one end, means removably supporting said board over said receptacle, and a guard wall around the board and projecting above the same.

2. A self-contained food preparing unit including a receptacle, a flat chopping board completely covering said receptacle and having an opening therethrough at one end only, means removably supporting said board over said receptacle, and an upwardly projecting guard wall around one side and one end of said board.

JOHN A. RUSS.

REFERENCES CITED

The following references are of record in the file of this patent:

UNITED STATES PATENTS

| Number | Name | Date |
|---|---|---|
| 1,364,289 | Low and Gavin | Jan. 4, 1921 |
| 1,854,128 | Thompson | Apr. 8, 1930 |
| 2,194,177 | Rundell | Mar. 19, 1940 |

FOREIGN PATENTS

| Number | Country | Date |
|---|---|---|
| 3,036 of 1904 | Great Britain | Feb. 2, 1904 |
| 248,587 | Germany | June 25, 1912 |